(12) United States Patent
Kashu et al.

(10) Patent No.: US 7,457,011 B2
(45) Date of Patent: Nov. 25, 2008

(54) IMAGE READING DEVICE AND IMAGE PROCESSING APPARATUS

(75) Inventors: Yosuke Kashu, Nara (JP); Takateru Yamamoto, Uji (JP); Masako Shinozuka, Nara (JP); Koji Yakushiji, Kyoto (JP); Keisuke Tateishi, Nishinomiya (JP)

(73) Assignee: Sharp Kabushiki Kaisha, Osaka (JP)

( * ) Notice: Subject to any disclaimer, the term of this patent is extended or adjusted under 35 U.S.C. 154(b) by 916 days.

(21) Appl. No.: 11/014,039

(22) Filed: Dec. 16, 2004

(65) Prior Publication Data
US 2005/0141051 A1 Jun. 30, 2005

(30) Foreign Application Priority Data
Dec. 24, 2003 (JP) .............................. 2003-426469

(51) Int. Cl.
H04N 1/04 (2006.01)
H04N 1/46 (2006.01)

(52) U.S. Cl. .................. 358/497; 358/493; 358/474; 358/505

(58) Field of Classification Search ................ 358/497, 358/493, 474, 505, 483, 482, 512–514; 399/211
See application file for complete search history.

(56) References Cited

U.S. PATENT DOCUMENTS 6,831,759 B1 * 12/2004 Witte et al. .................. 358/474
2004/0085596 A1 * 5/2004 Chen et al. .................. 358/493

FOREIGN PATENT DOCUMENTS

| JP | 09-307695 | 11/1997 |
| JP | 2000-013547 | 1/2000 |
| JP | 2002-218166 | 8/2002 |
| JP | 2002-247294 | 8/2002 |
| JP | 2003-189060 | 7/2003 |
| JP | 2003-307794 | 10/2003 |

* cited by examiner

Primary Examiner—Houshang Safaipour
(74) Attorney, Agent, or Firm—Menner, Otto, Boisselle & Sklar, LLP (57) ABSTRACT

An image reading device has a movable platen glass that is rotatably supported, that is substantially a prism having a plurality of read faces, and that is constructed so that rotation of the platen glass can switchably place one of the read faces in the read position. Therefore, even if the platen glass becomes stained, the image reading device makes it possible to start or continue reading document images without requiring labor and time for cleaning the platen glass.

17 Claims, 5 Drawing Sheets

IMAGE READING DEVICE AND IMAGE PROCESSING APPARATUS

This Nonprovisional application claims priority under U.S.C. § 119(a) on Patent Application No. 426469/2003 filed in Japan on Dec. 24, 2003, the entire contents of which are hereby incorporated by reference.

FIELD OF THE PRESENT INVENTION

The present invention relates to an image reading device that reads an image from a document being carried along a platen glass, and an image processing apparatus having the image reading device.

BACKGROUND OF THE PRESENT INVENTION

Image processing apparatuses such as copying machines, scanning devices, and facsimile machines are provided with an image reading device that reads an image from a document.

An image reading device (document reading device) provided with a so-called ADF (automatic document feeder) has an image reading section (document reading section) that, in a resting state, reads a document image from a document being carried along a platen glass (read glass). At that time, there are cases where the document comes into contact with the platen glass, and the platen glass is stained by unfixed materials on the document. The stain produces streaks of noise in the obtained image data, with the result that the quality of the image is badly impaired.

In light of such a problem, for example, Japanese Laid-Open Patent Publication No. 307695/1997 (Tokukaihei 09-307695; published on Nov. 28, 1997) teaches providing a contact-preventing device for preventing documents from coming in contact with a platen glass, in order to prevent the platen glass from being stained.

However, the document coming into contact with the platen glass is not the only factor that causes stains, and the platen glass can also be stained by non-contact factors such as paper dust or dust. The technique described in the above publication (Tokukaihei 09/307,695) suffers from a drawback in that it cannot deal with these factors other than the contact factor.

On this account, once the platen glass is stained, users need to clean the platen glass before reading a document, either before starting the operation or by interrupting the operation. This requires labor and, in particular, causes an inconvenience to users in a hurry.

SUMMARY OF THE PRESENT INVENTION

It is an object of the present invention to provide an image read device that, even if a platen glass is stained, can read or continue reading document images without the need for labor and time for cleaning the platen glass.

In order to achieve the foregoing object, an image reading device according to the present invention and an image processing apparatus provided therewith include a platen glass and an image reading section for reading an image from a document being carried along the platen glass. The platen glass has a plurality of read faces that face the document to read the image on the document being carried to be read. The platen glass is supported so that the read faces are switchably placed in a read position along the document being carried.

According to this arrangement, the platen glass has a plurality of read faces that face the document being carried to read the image, and is supported so that the read faces are switchably placed in a read position along the document being carried. Therefore, even in the case where one of the read faces has become stained, the image reading device can start or continue reading document images by switching the read faces stained to another read face.

The read faces may be switched, for example, by a platen glass that is rotatably supported, and is substantially a prism having a plurality of read faces, and is constructed so that rotation of the platen glass switchably places one of the read faces in the read position.

This makes it possible to realize a read-face switching mechanism that saves much more space than constructions in which, for example, a plate platen glass provided with a plurality of read-face areas is slid to switch the read faces.

For a fuller understanding of the nature and advantages of the present invention, reference should be made to the ensuing detailed description taken in conjunction with the accompanying drawings.

DESCRIPTION OF THE EMBODIMENTS

To understand the present invention, one embodiment of the present invention will be described in reference to the accompanying drawings. The following embodiment merely serves as an example in which the present invention is embodied, and it does not limit the technical scope of the present invention in any way.

Figure 1:
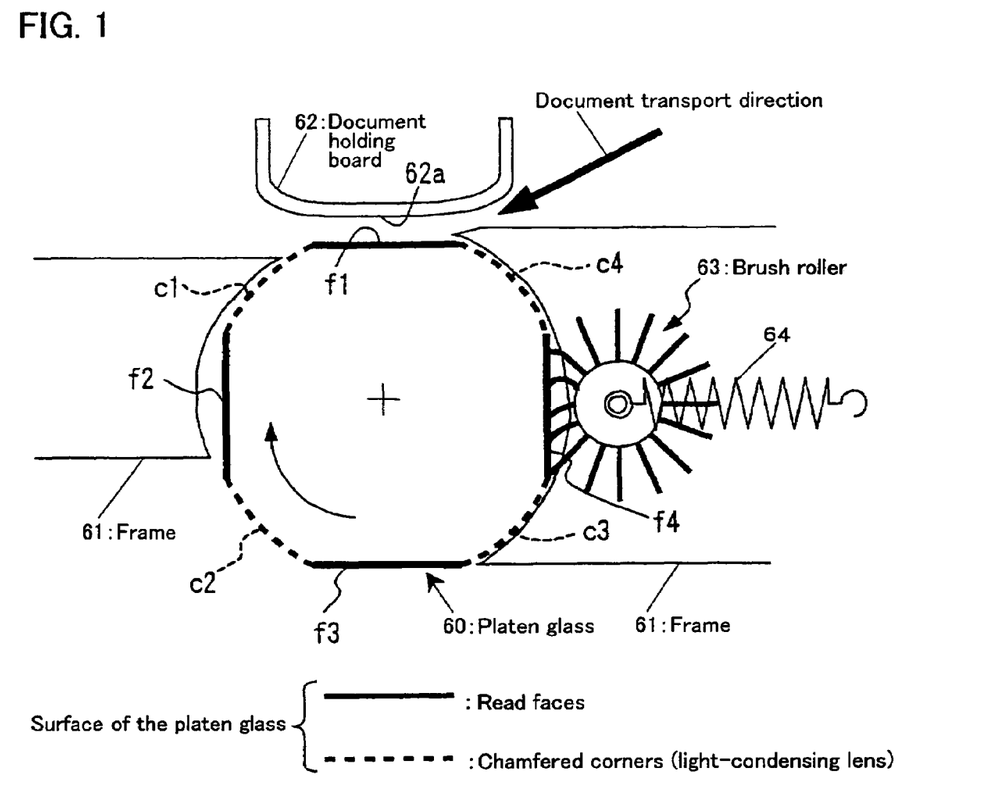
FIG. 1 is a cross sectional view schematically showing a structure of a main portion of a document reading device X according to one embodiment of the present invention.
Figure 2:
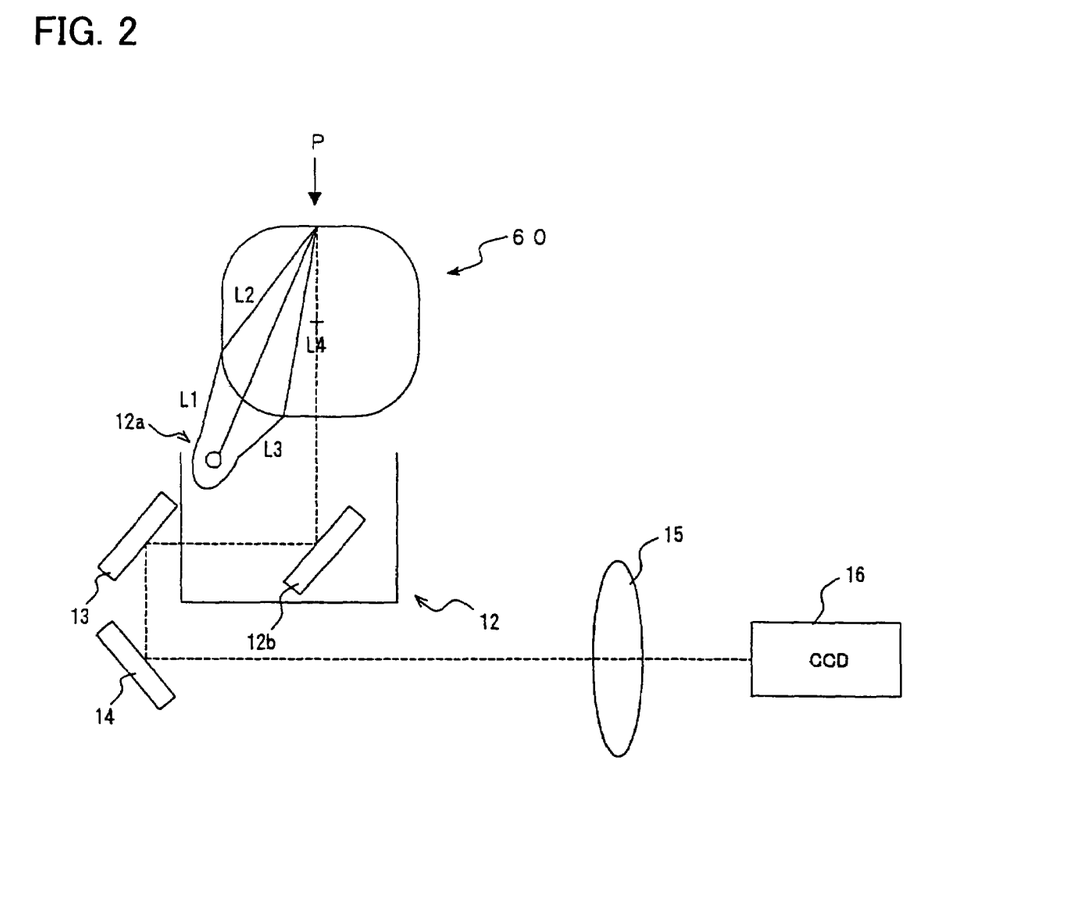
FIG. 2 is a schematic diagram illustrating light-condensing functions of a platen glass provided in the document reading device X.
Figure 3:
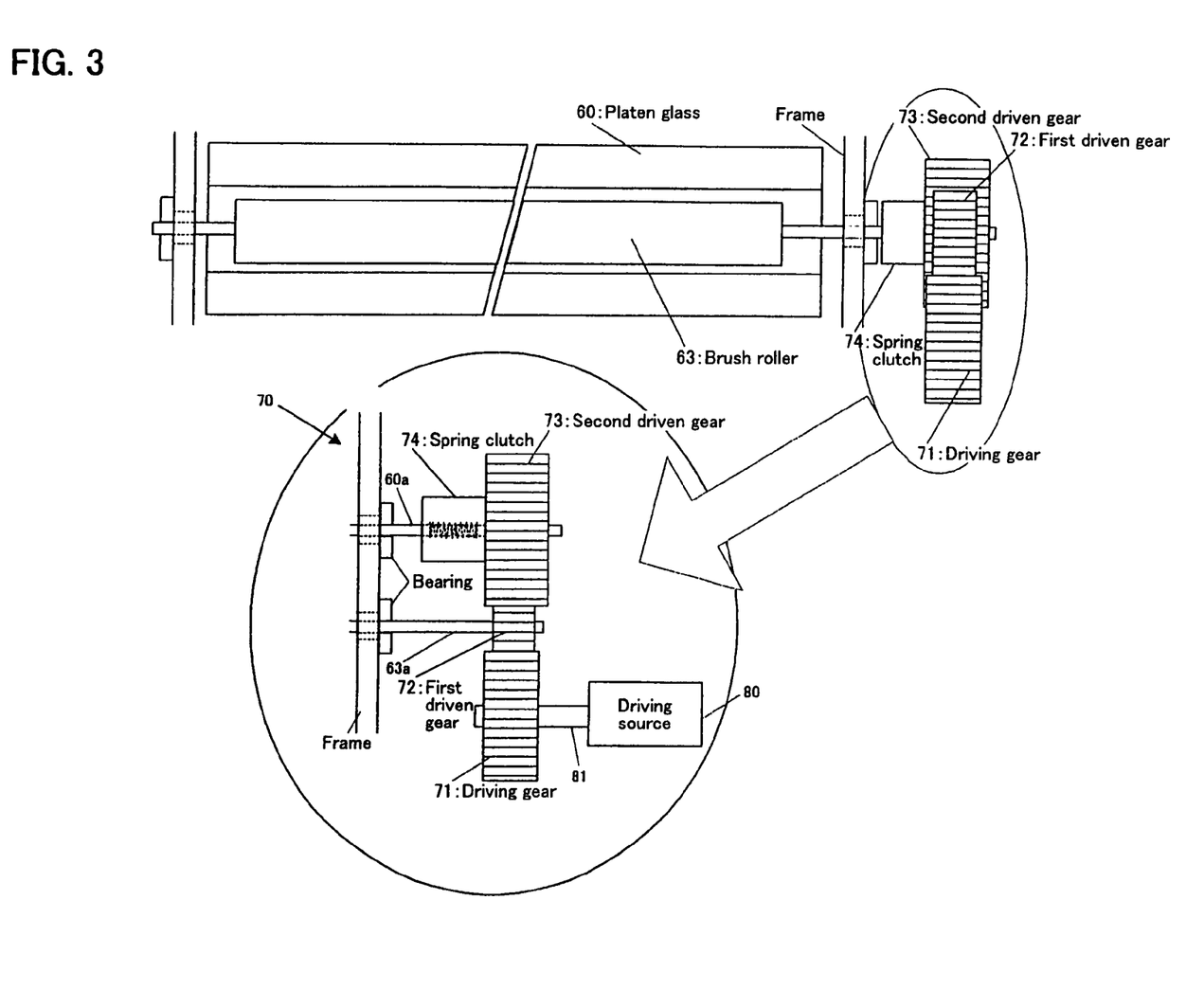
FIG. 3 is a schematic diagram showing a linking mechanism of a driving source for the platen glass in the document reading device X.
Figure 4:
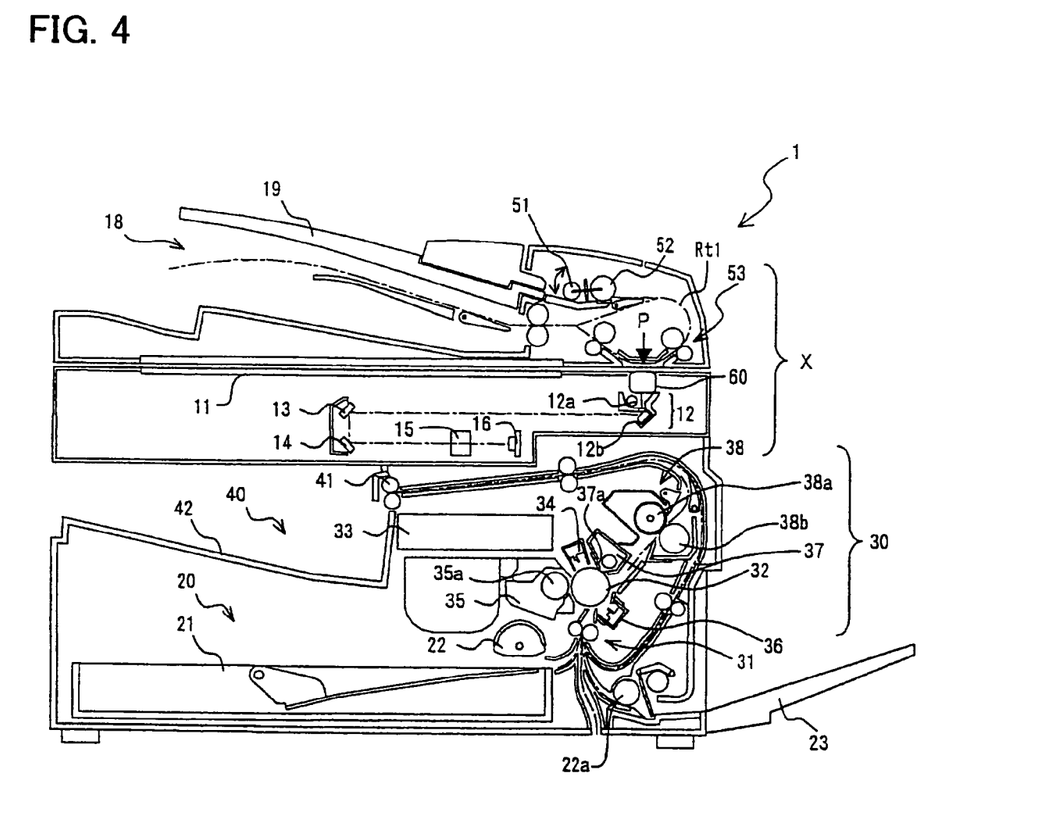
FIG. 4 is a cross sectional view schematically showing an image processing apparatus 1 in which the document reading device X is installed.
Figure 5:
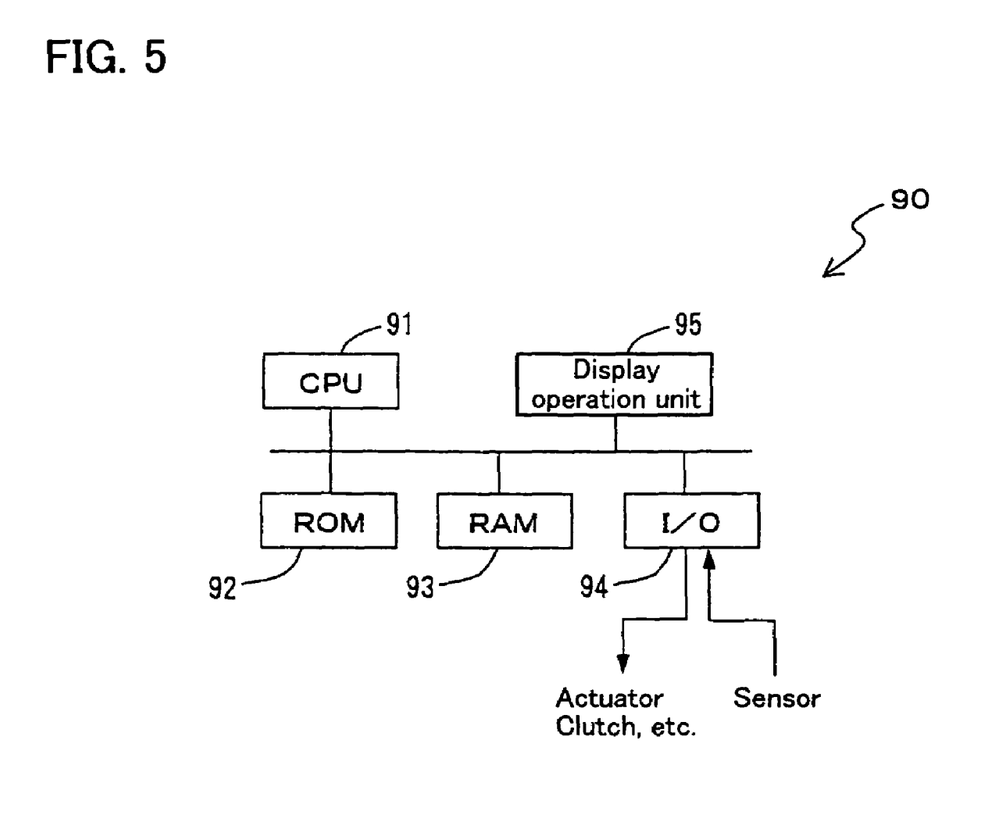
FIG. 5 is a block diagram showing a schematic construction of a control section of the document reading device X.

FIG. 1 is a cross sectional view schematically showing a structure of a main portion of a document reading device X according to one embodiment of the present invention. FIG. 2 is a schematic diagram illustrating light-condensing functions of a platen glass provided in the document reading device X. FIG. 3 is a schematic diagram showing a linking mechanism of a driving source for the platen glass in the document reading device X. FIG. 4 is a cross sectional view schematically showing an image processing apparatus 1 in which the document reading device X is installed. FIG. 5 is a block diagram showing a schematic construction of a control section of the document reading device X.

First, referring to the cross sectional view of FIG. 4, description is made below as to a construction of an image processing apparatus 1 provided with a document reading device X to be described later in the embodiments of the present invention.

The image processing apparatus 1 has three print modes, including a copy mode (duplication mode), a printer mode, and a facsimile mode. In the image processing apparatus 1, a control section (not shown) selects a print mode according to operating instructions from an operating section (not shown) or instructions of print jobs sent from external host devices such as personal computers.

As shown in FIG. 1, the image processing apparatus 1 can be divided broadly into an image reading device X, a paper feeding section 20, a printing section 30, and a ejecting section 40. The image reading device X is disposed above the paper feeding section 20, and the ejecting section 40 is disposed between the image reading device X and the paper feeding section 20.

In the following, the copy mode, one of various processing modes described above, will be described.

A user can start copying by pressing the start key on the operation panel after having placed a document on a platen glass 11 provided for document placement in the image reading device X (scanning section). Prior to pressing the start key, the user loads sheets (recording sheets) in a paper feed cassette 21 of the paper feeding section 20, or a manual paper feed tray 23 provided on one side of the apparatus, and enters operating conditions (print quantity/magnifying factor and so on) through the operation panel provided on the front part of the apparatus body.

Pressing the start key actuates a main drive motor (not shown) and driving gears start rotating. Thereafter, a paper feed roller 22 or 22a rotates to carry (feed) a sheet into the apparatus, and the sheet so fed reaches and is captured by regist rollers 31 (a pair of rollers). The regist rollers 31 pause the sheet temporarily so as to synchronize it with the top of an image (beginning part of image formation) formed on a photoreceptive drum 32. In addition, the top of the sheet is pressed uniformly against the regist rollers 31 so as to correct for any misregistration at the top of the sheet, or any angle on the transported sheet.

In the image reading device X, a copy lamp 12a (light source) is lit, and a copy lamp unit 12 moves in the direction of the arrow to start exposure. The light irradiated onto the document by the copy lamp 12 becomes reflected light containing image information of the document (reflected light from the document). In the copy lamp unit 12, the reflected light is reflected by a first mirror 12b, a second mirror 13, and a third mirror 14 into an optical lens 15 before it is read by a CCD 16. The copy lamp unit 12, the second mirror 13, the third mirror 14, the optical lens 15, and CCD 16 constitute an image reading section (image reading means).

The optical image information in the reflected light is converted to an electrical signal in the CCD circuit installed in the control section (not shown). The image information signal (image information of the electrical signal so converted) is processed according to preset conditions and is sent as print data to an LSU unit 33.

The photoreceptive drum 32 is entirely electrified to a predetermined electrical potential by an electrifying unit 34. The laser light from the LSU unit 33 is irradiated onto the photoreceptive drum 32 through a polygonal mirror (not shown) and various lenses to form an electrostatic latent image on the photoreceptive drum 32. Thereafter, toner on an MG roller 35a provided in a developing tank 35 is attracted to the surface of the photoreceptive drum 32, the electrostatic latent image is developed by the toner according to an electric potential difference generated on the photoreceptive drum 32.

A sheet to be developed is carried toward the photoreceptive drum 32 at the timing of the regist rollers 31, and the toner on the receptive drum 32 is transferred by a transfer unit 36 (corona charger) onto the sheet. The residual toner on the photoreceptive drum 32 is scraped by a cleaning blade 37a of a drum unit, and is collected by a cleaner unit 37.

The sheet finished with toner transfer is ejected by ejecting rollers 41 to an ejection tray 42 through an upper heat roller 38a and a lower heat roller 38b of a fixing device 38 (fixing step). The upper heat roller 38a and the lower heat roller 38b are disposed by being pressed against each other, and the sheet is heated and pressed when passing through a nip section between the rollers 38a and 38b so that the unfixed toner on the sheet is melted to be fixed on the sheet.

In the case where a predetermined sensor finds a document loaded on a document tray 19 of the image reading device X, pressing the start key in a predetermined manner will rotate a feed roller 51 to feed the document loaded on the document tray 19 into the image reading device X, where the document travels through a predetermined transport route Rt1. The transport route Rt1 is provided with regist rollers 53, which capture the document. After the top of the document is aligned for predetermined position, the regist rollers 53 send out the document to a read position P at predetermined timing. Here, the alignment of the top of the document also corrects for any angle on the transported sheet.

The copy lamp unit 12 exposes the transported document stopping at a predetermined stop position (read position P). The process by which the document image is read with the reflected light obtained by the exposure of the document has already been described above.

The document whose image has been read is ejected to a document ejecting section 18.

Disposed in the read position P is a movable platen glass 60, which is a rotatably supported glass member. The platen glass 60 transmits light irradiated on the document by the copy lamp unit 12, and light reflected from the document.

In the following, a schematic structure of a control section 90 that controls the image reading device X will be described in reference to the block diagram of FIG. 5.

The control section 90 has a CPU 91, a ROM 92, a RAM 93, an I/O 94, and a display operation unit 95. The CPU 91 performs various kinds of operations. The ROM 92 stores (memorizes) control programs executed by the CPU 91. The RAM 93 develops the control programs during execution. The I/O 94 outputs control signals to various actuators, clutches (described later), and the like provided in the image reading device X, and receives detection signals from various sensors, thereby relaying the signals in and out of the CPU 91. The display operation unit 95, realized by a liquid-crystal touch panel and the like, is used to enter various kinds of information and commands to the image processing apparatus 1 (including the image reading device X) and display a status of the apparatus.

By executing the control programs, the control section 90 outputs control signals to various actuators and the like through the I/O 94 according to inputs from various sensors.

As described above in reference to FIG. 1, when reading the image of a document placed on the document tray 19, the image reading device X transports the document from the document tray 19 to the read position P so as to read the image from the document being carried along the movable platen glass 60.

A feature of the image reading device X is that the movable platen glass 60 has a plurality of read faces that face a document when the document is transported to read an image, and that the read faces can be switchably placed in the read position P (position along the document being transported).

The following describes a structure around the movable platen glass 60, which is a main portion of the image reading device X, in reference to the cross sectional view of FIG. 1.

The movable platen glass 60 is a substantially quadratic prism that is rotatably supported and has a plurality of flat surfaces f1 to f4 (called "read faces" hereafter). The movable platen glass 60 is constructed so that rotation of the movable platen glass 60 can switchably place one of the read faces f1 to f4 in the read position P. The movable platen glass 60 is shaped into a substantially quadratic prism such that two pairs (plural pairs) of parallel read faces are provided (f1 being parallel to f3, f2 being parallel to f4).

Moreover, the movable platen glass 60 of the substantially quadratic prism shape has its corners chamfered (called "chamfered corners c1 to c4" hereafter). In addition, the movable platen glass is a substantially regular quadratic prism.

Located upstream and downstream of the document transport direction with respect to the read position P of the movable platen glass 60 is a frame 61 (cover) for preventing paper dust or dust from entering the device from outside. The frame 61 has a curved portion opposite the movable platen glass 60 so as to leave as little space as possible between the frame 61 and the movable platen glass 60.

When the movable platen glass 60 is not a substantially regular quadratic prism (or a substantially regular polygonal prism), the movable platen glass 60 cannot provide a constant distance between its rotation axis and its surface. This inevitably widens the gap between the frames 61 and the platen glass 60. However, with the substantially regular quadratic prism shape, the movable platen glass 60 can provide a constant distance between its rotation axis and its surface, and thereby reduces the gap therebetween. In addition, the movable platen glass 60 has its corners chamfered so as to make the gap even narrower.

In addition, the image reading device X is equipped with a brush roller 63 (an example of the cleaning means) for cleaning one of the read faces f1 to f4 (f4 in FIG. 1) not positioned in the read position P. The brush roller 63 is pushed against one of the read faces f1 through f4 by an elastic member 64 such as a spring, and by rotating itself, cleans one of the read faces f1 to f4 not involved in document reading.

In this way, one of the read faces f1 through f4, if it is stained, is automatically cleaned while one of the remaining read faces is being used in the read position P. This not only saves users trouble of cleaning but also prevents the image reading from being interrupted by the stain when it is present on all of the read faces f1 through f4.

Note that, although only one brush roller 63 is provided in FIG. 1, more than one brush roller 63 may be provided. For example, another brush roller 63 may be provided opposite the brush roller 63 shown in FIG. 1 (on the read face f2 side).

In addition, the chamfered corners c1 to c4 of the movable platen glass 60 are formed to serve as lenses for condensing the light from the copy lamp 12a onto the read faces f1 to f4 (one of f1 to f4) in the read position P.

FIG. 2 is a schematic diagram illustrating the light-condensing functions of the movable platen glass 60.

As shown in FIG. 2, when the read face f1 is at the read position P, the light from the copy lump 12a incident on the surface of the chamfered corner c2 is condensed onto the read face f1 by being refracted on the curved surface of the chamfered corner c2. Among the rays of reflected light (scattered light) on the surface of a document (not shown) in contact with the read face f1, those reflected perpendicularly to the document surface and falling perpendicularly on the parallel face (read face f3) opposite the read face f1 are received by the CCD 16 through the first to third mirrors 12b, 13, and 14.

Similarly, when the read faces f2, f3, and f4 are placed in the read position P, the chamfered corners c3, c4, and c1 serve as a light-condensing lens, respectively. This realizes a simple construction in which light from the copy lamp 12a (light source) can be condensed efficiently onto a document. This makes it possible to use even a light source whose light intensity is comparatively low.

The emitted light from the copy lamp 12a will be more effectively condensed if the chamfered corners c2 to c4 and c1 are formed in such a way that two light path lengths (L1+L2 and L3+L4 in FIG. 2) to the read faces f1 to f4, at both outer edges of the area, irradiated with light emitted from the copy lamp 12a, of the movable platen glass 60, are substantially equal to each other.

The movable platen glass 60 may be shaped into a substantially prism shape in which the opposing faces are not parallel to each other, for example, such as a substantially triangular or pentangular prism (odd numbered faces). However, in this case, the reflected light cannot emerge from the face opposite to the read face placed in the read position P. Therefore, the first mirror 12b needs to be disposed on the opposite side to the copy lamp 12a (right facing FIG. 2). Thus, a construction (arrangement) different from conventional general constructions is required.

Moreover, this image reading device X is equipped with a read-face switching mechanism (an example of the read-face switching means) for driving the movable platen glass 60 to switchably place one of the read faces f1 to f4 in the read position P.

FIG. 3 is a diagram schematically showing a construction of the read-face switching mechanism 70.

A driving source 80 for transporting documents is used also as a driving source for both the brush roller 63 and the movable platen glass 60.

A rotation axis 81 of the document-transporting driving source 80 is provided with a driving gear 71. A rotation axis 63a of the brush roller 63 is provided with a first driven gear 72. A rotation axis 60a of the movable platen glass 60 is provided with a second driven gear 73 through an electric spring clutch 74.

The driving gear 71 and the first driven gear 72 are disposed to engage with each other, so that the actuator of the brush roller 63 (an example of the cleaning means) is linked to the document-transporting driving source 80.

In addition, the first driven gear 72 and the second driven gear 73 are disposed to engage with each other.

In the read-face switching mechanism 70, the spring clutch 74 maintains or cuts off the linkage between the actuator of the movable platen glass 60 and the actuator of the brush roller 63 (cleaning device) in order to start or stop rotation of the movable platen glass 60 and thereby switch the positions of the read faces f1 to f4. This switching control is carried out by the control section 90, which, by executing control programs, causes a control signal to be outputted to the spring clutch 74 through the I/O 94.

Timing control for switching the clutch in switching the positions of the read faces f1 to f4 can be controlled, for example, according to a detection result obtained by a contact limit switch (not shown) that detects a predetermined amount of rotation upon contacting a projection and the like provided on the rotation axis 60a of the movable platen glass 60, or by a potentiometer (not shown) that detects the rotational frequency of the rotation axis 60a.

In addition, the control section 90 controls the read-face mechanism 70 in such a manner that the positions of the read faces f1 to f4 are switched at two different timings, as described below.

In one method of controlling the spring clutch 74, the control section 90 (an example of read number counting means) counts the number of times documents have been read, and when the count exceeds a predetermined number, the read-face switching mechanism 70 (an example of the read-face switching means) switches the positions of the read faces f1 to f4 of the movable platen glass 60.

In this way, the read faces f1 to f4 can be switched as a preventative measure when they are likely to be stained, even before they actually become stained.

In order to count the number of documents have been read, the document carrier route RT1 is provided with a paper passage sensor for detecting the passage of documents whose images have been read, and the number of sheets having passed through the route is counted according to a detection result obtained by the paper passage sensor. The detection result obtained by the paper passage sensor are input through the I/O 94 into the CPU 91.

In another method of controlling the spring clutch 74, the control section 90 (an example of stain detecting means) detects stain on the read faces f1 through f4 of the movable platen glass 60 when a document placed on the document tray 19 starts being transported (sent out). According to the result of detection (i.e., when stain was detected), the read-face switching mechanism (an example of the read-face switching means) switches the positions of the read faces f1 to f4 of the movable platen glass 60.

The control section 90 detects stain on the read faces f1 to f4 according to an image (plain image) formed on a reference read face 62a on the underside (opposite the read face) of a document holding board 62 (see FIG. 1; an example of a reference member) disposed above the read position P, with no document placed on the document read position P. That is, the control section 90 detects stain when some kind of image (all pixels are above a predetermined luminance) is found in the image read from the reference read face that is normally supposed to have a plain image (more than a predetermined number of pixels fall below the predetermined luminance).

This prevents the read faces f1 to f4 from being continuously used to read images with the stain thereon.

In the case where stain is detected according to the result reading the reference read face 62a, the read faces f1 to f4 will inevitably be found stained even when it is the reference read face 62a itself that is actually stained.

Accordingly, the control section 90 in the image reading device X also detects stain on the reference read face 62a.

That is, upon detecting stain on a read face (f1, for example) placed in the read position P, the control section 90 (an example of the stain detecting means and reference-read-face stain indicating means) indicates the presence of detected stain on the reference read face 62a when the control section 90 detects stain on a read face that has been switched by the read-face switching mechanism 70 from the stained read face (f1). The indication is made by displaying such messages on the display operation unit 95 as, "Remove stain on the cover."

This distinguishes between the stain on the movable platen glass 60 and the stain on the reference read face 62a, so as to recommend users to clean the reference read face 62a.

In order to achieve the foregoing object, the present invention provides an image reading device for reading an image from a document being carried along a platen glass. The platen glass has a plurality of read faces that face the document being carried to read the image on the document. The platen glass is supported so that the read faces are switchably placed in a read position to face the document being carried.

On this account, even in the case where one of the read faces has become stained, the image reading device can start or continue reading document images by switching to another read face.

The read faces may be switched, for example, by a platen glass that is rotatably supported, is substantially a prism having a plurality of read faces, and is constructed so that rotation of the platen glass can switchably place one of the read faces in the read position.

This makes it possible to realize a read-face switching mechanism that saves much more space than constructions in which, for example, a plate platen glass provided with a plurality of read-face areas is slid to switch read faces.

Furthermore, in this case, it is preferable that the platen glass be substantially a prism having plural pairs of read faces parallel to each other.

Generally, image reading devices receive perpendicularly reflected light (scattered light) from the surface of a document in order to read an image. According to the above construction, the perpendicularly reflected light from the surface of the document can be received through a parallel face (one of the read faces) opposite the read face placed in the read position, without changing the conventional construction.

In addition, if the platen glass is substantially a prism having its corners chamfered, its cross sectional shape will become substantially circular. That is, the maximum distance difference from the rotation axis to the surface will become close to 0 (zero), so that the rotation radius of the platen glass is reduced for space saving. Moreover, a cover provided around the platen glass can be put closer to the surface of the platen glass. This minimizes the occurrence of paper dust or dust entering the apparatus through the gap between the cover and the platen glass.

In this case, if the chamfered corners of the platen glass form lenses for condensing the light from a light source onto the read face in the read position, the light from the light source can be condensed efficiently onto a document with a simple construction. Further, even a light source whose light intensity is comparatively low can be used.

In addition, although an image reading device may be provided with a lever or the like so as to manually switch the read faces, it may also be provided with a read-face switching device (read-face switching section) to drive the platen glass so as to switch the positions of the read faces.

In addition, if the image reading device is provided with a cleaning device (cleaning section) to clean one or more of the read faces not positioned in the read position, a stained read face is automatically cleaned while a clean read face is being used. This not only saves users trouble of cleaning but also prevents the image reading from being interrupted by the stain when it is present in all of the read faces.

Moreover, if an actuator of the cleaning device is linked to the driving source for carrying documents, the driving source for carrying documents can also be used as a driving source of the cleaning device, realizing a simple construction. In this case, the read faces not in use are cleaned while a document is being read (carried).

In addition, the read-face switching device may be equipped with a clutch for maintaining or cutting off the linkage between the actuator of the platen glass and the actuator of the cleaning device in order to switch the positions of the read faces.

According to the above construction, since the driving of the platen glass to switch the read faces is only temporarily needed, the driving source of the cleaning device can also be used as a driving source of the platen glass. It is more preferable here that the driving source for carrying documents be used also as a driving source of the cleaning device so that the driving source for carrying documents can also be used as a driving source of both the cleaning device and the platen glass. In this case, by the time a document reaches the platen glass from the start of its transport, the read faces have already been switched by the driving of the platen glass. Before the end of the document transport, a stained read face is cleaned.

In addition, in order to switch the read faces, an image reading device may be provided, for example, with a read number counting device (read number counting section) for counting the number of times documents have been read, and the read-face switching device switches the positions of the read faces according to the counted number obtained by the read number counting device.

In addition, an image reading device may be provided with a stain detecting device (stain detecting section) for detecting stain on the read faces of the platen glass so that the read-face switching device switches the positions of the read faces of the platen glass according to a detection result obtained by the stain detecting device.

In order to detect stain, an image reading device may have a reference member provided with a reference read face opposite the read face placed in the read position, and the stain detecting device may detect stain according to images read from the reference read face.

Moreover, in this case, an image reading device may be provided with a reference-read-face stain indicating device (reference-read-face stain indicating section) for indicating the presence of stain on the reference read face when the stain detecting device detects stain on the read face that has been switched by the read-face switching device from a stained read face previously detected by the stain detecting device.

This distinguishes between the stain on the platen glass and the stain on the reference read face so as to recommend users to clean the reference read face.

In addition, the present invention provides an image processing apparatus having the foregoing image reading devices.

The present invention being thus described, it will be obvious that the same way may be varied in many ways. Such variations are not to be regarded as a departure from the spirit and scope of the present invention, and all such modifications as would be obvious to one skilled in the art are intended to be included within the scope of the following claims.

What is claimed is:

1. An image reading device comprising:
   a platen glass; and
   image reading means for reading an image from a document being carried along the platen glass,
   the platen glass having a plurality of read faces that face the document being carried to read the image on the document, and the platen glass being supported so that the read faces are switchably placed in a read position to face the document being carried.

2. An image reading device according to claim 1,
   wherein the platen glass with the plurality of read faces is substantially a prism, and is rotatably supported, and
   wherein the platen glass is structured so that rotation of the platen glass switchably places one of the read faces in the read position.

3. An image reading device according to claim 2, wherein the platen glass is substantially a prism having plural pairs of read faces parallel to each other.

4. An image reading device according to claim 2, wherein the platen glass is substantially a regular polygonal prism.

5. An image reading device according to claim 2, wherein the platen glass is substantially a prism having its corners chamfered.

6. An image reading device according to claim 2, the platen glass is substantially a regular polygonal prism having even numbers of faces and having its corners chamfered.

7. An image reading device according to claim 5, wherein the chamfered corners of the platen glass form lenses for condensing light from a light source onto the read face placed in the read position.

8. An image reading device according to claim 1, further comprising read-face switching means for driving the platen glass to switch positions of the read faces.

9. An image reading device according to claim 1, further comprising cleaning means for cleaning a read face not placed in the read position.

10. An image reading device according to claim 9, wherein an actuator of the cleaning means is linked to a driving source for carrying documents.

11. An image reading device according to claim 8, further comprising cleaning means for cleaning a read face not placed in the read position,
    wherein the read-face switching means includes a clutch for maintaining or cutting off linkage between an actuator of the platen glass and an actuator of the cleaning means, whereby positions of the read faces are switched.

12. An image reading device according to claim 11, wherein an actuator of the cleaning means is linked to a driving source for carrying documents.

13. An image reading device according to claim 8, further comprising:
    read number counting means for counting the number of times documents have been read; and
    control means for controlling the read-face switching means,
    wherein the control means causes the read-face switching means to switch positions of the read faces of the platen glass according to a counted number obtained by the read number counting means.

14. An image reading device according to claim 8, further comprising:
    stain detecting means for detecting stain on the read faces of the platen glass; and
    control means for controlling the read-face switching means,
    wherein the control means causes the read-face switching means to switch positions of the read faces of the platen glass according to a detection result obtained by the stain detecting means.

15. An image reading device according to claim 14, further comprising a reference member having a reference read face opposite the read face placed in the read position,
    wherein the stain detecting means detects stain according to an image read from the reference read face.

16. An image reading device according to claim 15, further comprising a reference-read-face stain indicating means for indicating the presence of detected stain on the reference read face when the stain detecting means detects stain on the read face that has been switched by the read-face switching means from a stained read face previously detected by the stain detecting means.

17. An image processing apparatus provided with an image reading device, the image reading device comprising:
    a platen glass; and
    an image reading device for reading an image from a document being carried along the platen glass,
    the platen glass having a plurality of read faces that face the document being carried to read the image on the document, and the platen glass being supported so that the read faces are switchably placed in a read position to face the document being carried.

* * * * *